(12) United States Patent
Sparrold et al.

(10) Patent No.: US 6,912,360 B1
(45) Date of Patent: Jun. 28, 2005

(54) FREE SPACE POINT-TO-MULTIPOINT OPTICAL COMMUNICATION SYSTEM AND APPARATUS

(75) Inventors: Scott W. Sparrold, Bothell, WA (US); Eric L. Upton, Bellevue, WA (US); Albert O. Okorogu, Redmond, WA (US)

(73) Assignee: Terabeam Corporation, Falls Church, VA (US)

( * ) Notice: Subject to any disclaimer, the term of this patent is extended or adjusted under 35 U.S.C. 154(b) by 591 days.

(21) Appl. No.: 09/938,906

(22) Filed: Aug. 24, 2001

(51) Int. Cl.[7] ............................................... H04B 10/00
(52) U.S. Cl. ........................................ 398/118; 398/182
(58) Field of Search ............................... 398/118–131; 385/73, 77, 79, 93, 57, 61

(56) References Cited

U.S. PATENT DOCUMENTS

| | | | |
|---|---|---|---|
| 5,710,652 A | * | 1/1998 | Bloom et al. ............... 398/129 |
| 5,754,941 A | | 5/1998 | Sharpe et al. |
| 6,330,241 B1 | | 12/2001 | Fort |
| 6,426,814 B1 | | 7/2002 | Berger et al. |
| 6,434,291 B1 | | 8/2002 | Kessler et al. |
| 6,472,776 B1 | * | 10/2002 | Soto et al. .................. 307/400 |
| 2002/0171896 A1 | * | 11/2002 | Clark et al. ................. 359/172 |

* cited by examiner

Primary Examiner—M. R. Sedighian
Assistant Examiner—David C. Payne
(74) Attorney, Agent, or Firm—Blakley Sokoloff Taylor & Zafman LLP (57) ABSTRACT

A free space point-to-multipoint optical transceiver has a reflective element and an optical feed mounted on the reflective element. When the optical feed is coupled to a light source, the optical feed is positionable to direct light received from the light source onto a reflective surface of the reflective element. Light directed onto the reflective surface is reflected towards a remote location to be received by a receiver located at the remote location. By adjusting a position of the optical feed, the reflected light is aimed. Therefore, adjusting the position of the optical feed provides a technique to track moving remote locations and/or to target different remote locations.

20 Claims, 9 Drawing Sheets

FREE SPACE POINT-TO-MULTIPOINT OPTICAL COMMUNICATION SYSTEM AND APPARATUS

TECHNICAL FIELD

This disclosure relates generally to optical communication systems and methods, and in particular but not exclusively, relates to free space point-to-multipoint optical communication systems.

BACKGROUND INFORMATION

With the increasing popularity of wide area networks (WANs), such as the Internet and/or the World Wide Web, network growth and traffic has exploded in recent years. Network users continue to demand faster networks and more access for both businesses and consumers. As network demands continue to increase, existing network infrastructures and technologies are reaching their limits.

An alternative to present day hardwired or fiber network solutions is the use of wireless optical communications. Wireless optical communications utilize point-to-point communications through free space and therefore do not require the routing of cables or fibers between locations. Thus, wireless optical communications are also known as free space or atmospheric optical communications. For instance, in a free space optical communication system, a beam of light is directed through free space from a transmitter at a first location to a receiver at a second location. Data or information is encoded into the beam of light, and therefore, the information is transmitted through free space from the first location to the second location.

Point-to-point free space optical communication systems require one optical transmitter for each optical receiver. The optical transmitter transmits an optical signal beam from its point of origin to a single point destination where an optical receiver is positioned. The transmitters of these point-to-point systems are called Single Axis Transmitters ("SAT"). Each SAT requires its own light source, such as a laser, for generating the light beam and its own optical system, such as a telescope, for focusing and aiming the light beam at the target receiver. The telescope is usually gimbal-mounted for pointing and tracking the optical receiver.

It is common to find a central hub location servicing multiple customer locations. For example, a hub location could be the location of a hardwired and/or fiber network Internet gateway. The customer locations can be dispersed about the hub location with varying distances and angular directions. Thus, each customer location requires an optical receiver or customer premise equipment ("CPE") and a corresponding SAT to transmit to each CPE.

Present devices use multiple axis transceivers ("MATs") for servicing multiple CPEs. A MAT is simply an array of SATs mounted on a single frame. Each SAT is gimbal-mounted within the MAT frame and requires an independent laser source and telescope. The duplicative electronics, mechanical apparatus, and optical elements found in the MATs can be costly, cumbersome, difficult to maintain, difficult to align, and heavy.

SUMMARY OF INVENTION

An aspect of the invention provides an apparatus having a reflective element having a reflective surface. An optical feed optically capable to receive a light signal is mounted to the reflective element. The optical feed is positionable to direct the light signal onto the reflective surface of the reflective element. The reflective element reflects the light signal directed from the optical feed towards a remote location facing the reflective element.

Another aspect of the invention provides an apparatus having a light emitter to emit a light signal. A refractive lens assembly is configured to receive the light signal emitted from the light emitter. The refractive lens assembly is further configured to refract the light signal to a remote location facing the refractive lens assembly.

BRIEF DESCRIPTION OF THE DRAWINGS

Non-limiting and nonexhaustive embodiments of the present invention are described with reference to the following figures, wherein like reference numerals refer to like parts throughout the various views unless otherwise specified.

DETAILED DESCRIPTION

Embodiments of a system and a method for free space point-to-multipoint optical ("FSPMO") communications are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FSPMO communication is a method of communication by emitting one or more optical signals from a source point to multiple receiver points simultaneously. In embodiments of the present invention, the source point is the location of the FSPMO transceiver and the receiver points are the locations of the customer premise equipment ("CPE"). Throughout this specification reference to a "transceiver" means that the particular embodiment may be implemented as a transmitter, a receiver, or a suitable combination of both.

Figure 1:
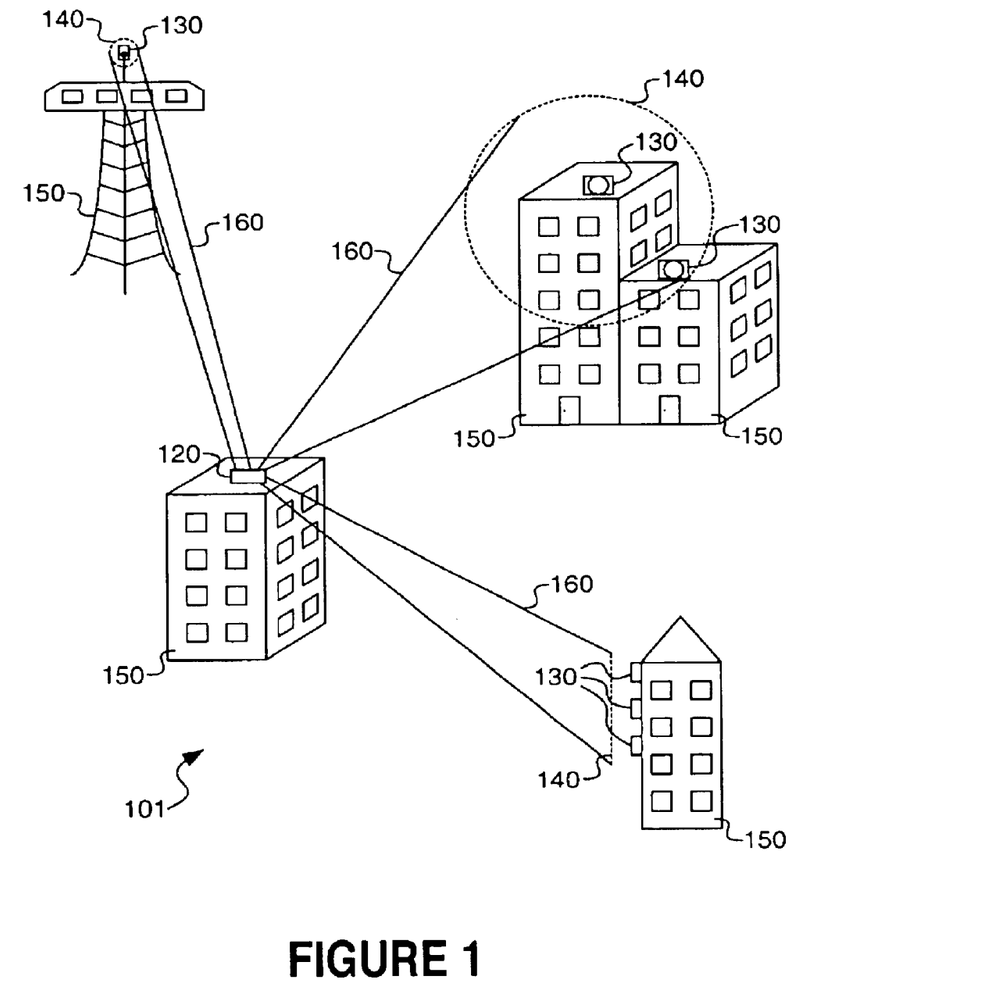
FIG. 1 illustrates a suitable environment for using various embodiments of a free space point-to-multipoint ("FSPMO") transceiver and examples of various suitable radiation patterns in accordance with the teachings of the present invention.

By way of example, FIG. 1 is an illustration of a suitable environment 101 for implementation and deployment of embodiments of the present invention. Although embodiments of the present invention may be used in any environment allowing a line of sight path for optical signals to travel between a transmitter, a receiver, a transceiver, or any useful combination thereof, the FSPMO communication system is well-suited for the urban environment. The optical signals are carried by beams of light on which data or information is modulated. The transmitter and receiver may be located at the same location or at different locations such as on different buildings 150. The line of sight may include reflections off one or more reflective surfaces between a transmitter and a receiver.

In one embodiment, FSPMO transceiver 120 can broadcast one or more optical beams 160 to predetermined sectors 140. Sectors 140 may range in angular size from as large as an entire hemisphere to as small as is required to target a single optical receiver. The size and directional orientation of sectors 140 can be adjusted for mere convenience or as required to service clusters of CPEs 130 mounted on buildings 150 positioned opposite FSPMO transceiver 120. CPEs 130 may also be positioned inside buildings 150, adjacent to (e.g., behind) windows, for instance. Each sector may contain any number of CPEs 130 receiving from and/or transmitting to the same FSPMO transceiver 120 central hub location. Furthermore, CPEs 130 residing within a single sector 140 may receive signals, on the same or different optical wavelength, and similarly may transmit back to FSPMO transceiver 120, on the same or different wavelength, as broadcast by FSPMO transceiver 120 or other CPEs 130. If multiple CPEs 130 share the same sector 140, standard broadcast networking solutions such as time division multiplexing ("TDM"), frequency division multiplexing ("FDM"), code division multiple access ("CDMA"), wavelength division multiplexing ("WDM"), or the like may be implemented.

In one embodiment, optical beams 160 are collimated beams of light. The cross-sectional diameters of the collimated beams are large enough to simplify and even eliminate point and tracking circuitry, in some instances.

It can be appreciated that the FSPMO transceiver 120 need not support both transmitter and receiver functions; rather, in alternative embodiments of the present invention FSPMO transceiver 120 of FIG. 1 is a FSPMO transmitter or a FSPMO receiver. The respective return communication paths from CPEs 130 may be supported by other communication systems, such as hardwired or radio frequency communication paths, used in conjunction with the FSPMO communication system. It should be appreciated that CPEs 130 may also be implemented with various embodiments of FSPMO transceiver 120, as disclosed herein.

Figure 2:
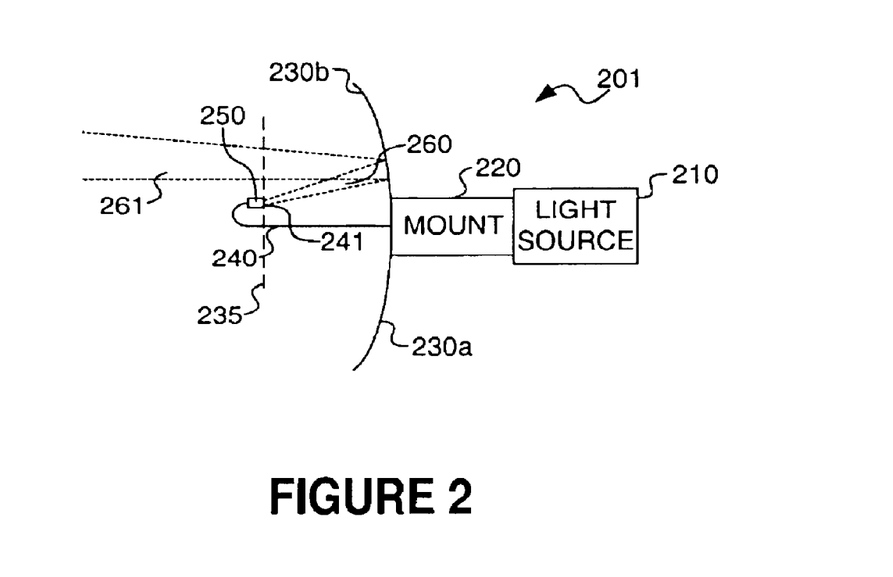
FIG. 2 illustrates a first reflective embodiment of the FSPMO transceiver in accordance with the teachings of the present invention.

FIG. 2 illustrates a first example reflective embodiment of a FSPMO transceiver 201. A light source 210 for producing light is optically coupled to an optical feed 240. In various embodiments, this coupling may be accomplished using any reasonable technique, including a free space light beam, an optical waveguide, or optic fiber. Light source 210 may be any known device for generating light having wavelengths falling within the infrared, visible, or ultraviolet regimes of the electromagnetic spectrum. In various embodiments, light source 210 comprises a laser such as an Erbium-dope fiber amplifier ("EDFA") device, a ruby crystal laser, a helium-neon laser, a laser diode, or another solid state device. However, a monochromatic light source is not necessary for implementation of the present invention. In one embodiment, light source 210 generates a plurality of wavelengths to implement a FDM network.

Optical feed 240 is positioned to emit light 260 received from light source 210 onto a reflective surface 230b of a reflective element 230a. In one embodiment, optical feed 240 comprises a rigid optic fiber with an end portion curved back towards reflective surface 230b, such that a terminal end 241 of optical feed 240 directs emitted light 260 onto reflective surface 230b. In one embodiment, optical feed 240 comprises a pre-cast fabricated optic fiber to retain its rigid shape. In another embodiment, optical feed 240 comprises a support such as a tubular housing through which a fiber optic cable is fed. Other approaches that are capable of directing light received from light source 210 onto reflective surface 230b are within the scope of various embodiments.

Emitted light 260 incident on reflective surface 230b of reflective element 230a is reflected towards a desired remote location in the form of an optical beam 261. By adjusting a position of optical feed 240, reflected optical beam 261 is aimed. Therefore, adjusting the position of optical feed 240 provides a method to track CPEs 130 that have moved and/or to target different CPEs 130 with the same optical feed 240 at different times.

In one embodiment, reflective element 230a comprises a concave mirror. The curvature of the concave mirror may be selected to obtain a desired focal length of reflective element 230a. In one embodiment, terminal end 241 of optical feed 240 is positioned within or near a focal plane 235 of the reflective element 230a. When terminal end 241 is positioned within focal plane 235, optical beam 261 is collimated. Placing terminal end 241 out of alignment with focal plane 235 produces a reflected diverging light beam 261. Either configuration may be used to obtain the desired operating conditions.

In one embodiment, optical feed 240 further comprises an endpoint element 250 connected to terminal end 241 of optical feed 240. Endpoint element 250 may be used to beam-form emitted light 260 and/or wavelength filter emitted light 260. By adjusting the divergence of emitted light 260 prior to reflecting emitted light 260 off of reflective surface 230b, the cross-sectional size and shape of optical beam 261 is controlled. An example beam forming and/or wavelength filtering endpoint element 250 is a lens with a wavelength selective coating. Another example of a wavelength filtering endpoint is a Fabry-Perot interference filter. However, other known beam forming and/or wavelength filtering endpoint elements are within the scope of various embodiments.

Optical feed 240 is mounted to reflective element 230a using a mounting element 220. In one embodiment, a small hole in reflective element 230a allows optical feed 240 to be inserted through it and optically coupled to light source 210 via an optic fiber or other technique described above. In one embodiment, mounting element 220 comprises a bracket adjustable about a plurality of axes. The bracket allows optical feed 240 to be manually aligned and then locked into position. In other embodiments, mounting element 220 comprises a fixed element, such as epoxy or another rigid mount, and the entire FSPMO transmitter 201 is aimed towards a remote location.

In order to optimize signal strength, it may be necessary to continually control the position and/or orientation of terminal end 241, while transmitting and/or receiving optical signals to/from a remote CPE 130. In one embodiment, mounting element 220 comprises a fiber positioner. In this embodiment, the base of optical feed 240, proximate to reflective element 230a, is inserted into a cavity containing magnetic fluid. Electrodes proximate to the cavity manipulate the magnetic fluid, thereby adjusting optical feed 240. The fiber positioner is capable of adjusting optical feed 240 with five degrees of freedom. The five degrees of freedom includes three translational coordinates X-Y-Z, elevation (e.g., pitch or tilt about the X axis), and azimuth (e.g., yaw or pan about the Y axis). Various embodiments of the fiber positioner include a position sensing system. The position sensing system provides a feedback loop implementing a self-adjust function tracking the movement of a CPE 130 at a remote location. Besides providing easier setup and alignment than precision manual pointing, the feedback loop allows mounting element 220 to adjust optical feed 240 without interrupting communications. Other approaches that provide adjustable mounting of optical feed 240 to reflective element 230a are within the scope of various embodiments.

An example of a fiber positioner that can be used in an embodiment of the present invention is disclosed in U.S. application Ser. No. 09/799,851, entitled "OPTICAL FIBER POSITION CONTROLLER FOR MULTIPLE DEGREES OF FREEDOM," filed Mar. 5, 2001, and incorporated herein by reference. An example of a position sensing system that can be used in an embodiment of the present invention is disclosed in U.S. application Ser. No. 09/805,655, entitled "CONDUCTIVE FLUID-BASED POSITION SENSOR AND METHOD," filed Mar. 13, 2001, and incorporated herein by reference.

Figure 3:
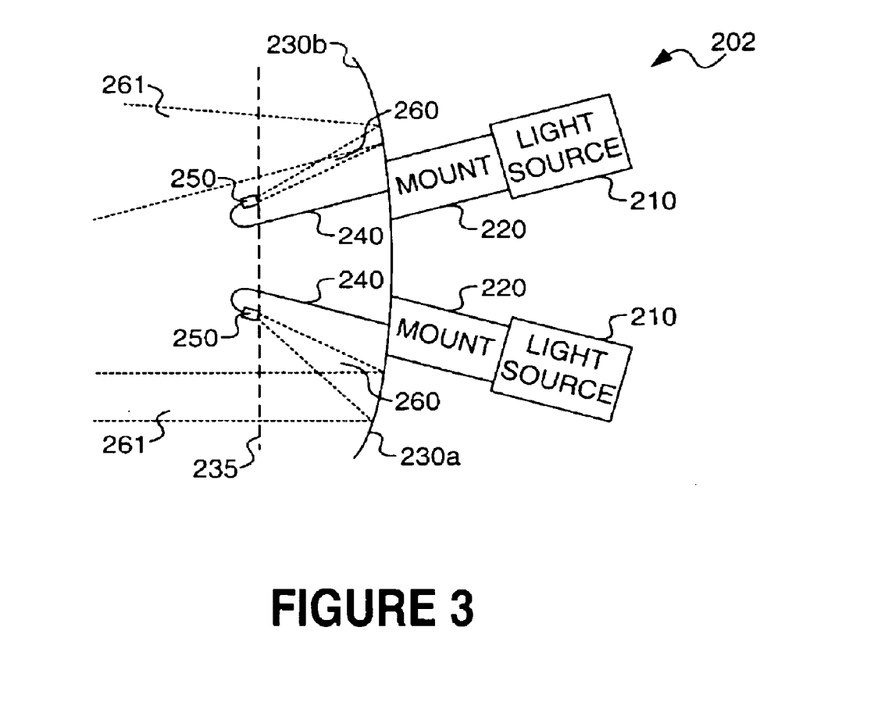
FIG. 3 illustrates a second reflective embodiment of the FSPMO transceiver implemented with multiple optical feeds in accordance with the teachings of the present invention.

FIG. 3 illustrates a FSPMO transceiver 202 implemented with multiple optical feeds 240. Multiple optical feeds 240 extend from a single reflective element 230a allowing one reflective element 230a to send and/or receive a plurality of optical beams 261 to/from a corresponding plurality of remote locations. Embodiments of the present invention are not limited to two optical feeds 240 sharing a single reflective element 230a, as shown in FIG. 3. Rather, the number of optical feeds 240 can be determined by physical space and efficiency requirements, as well as the number of CPEs 130 or other factors. In some situations, large numbers of optical feeds 240 may decrease the efficiency of the FSPMO transceiver 202, since transmitted and received light beams 261 are partially block by the head of each optical feed 240. Thus, the size and the shape of reflective element 230a, in addition, to the orientation, the placement, and the number of optical feeds 240 may be configured to optimize the operating efficiency of various embodiments of the FSPMO transceiver 202.

Figure 4A:
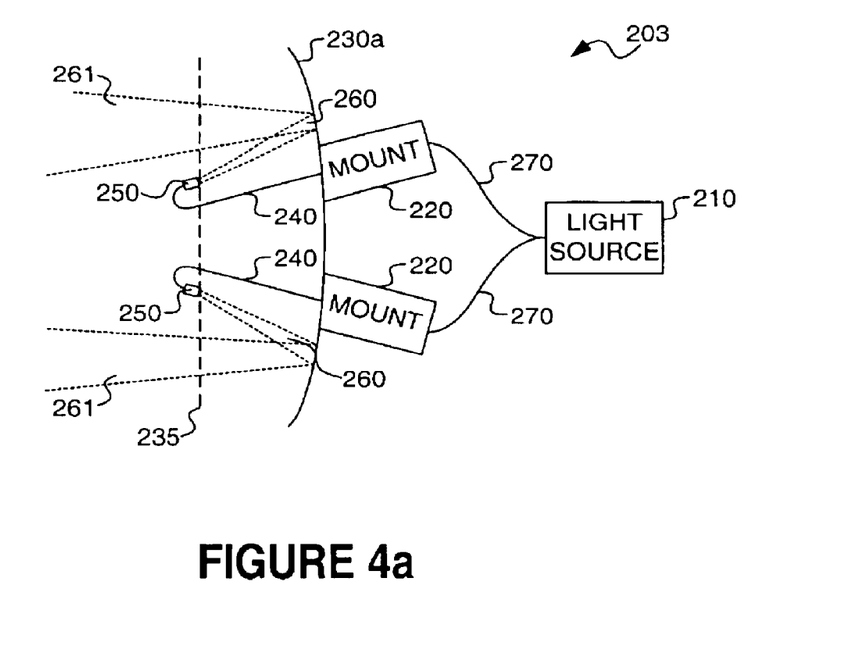
FIG. 4a illustrates a third reflective embodiment of the FSPMO transceiver implemented with a single light source in accordance with the teachings of the present invention.

In one embodiment, a FSPMO transceiver 203 is implemented using one light source 210 optically coupled to multiple optical feeds 240. As shown in FIG. 4a, light source 210 is coupled to optical feeds 240 using optic fibers 270. Light generated by light source 210 is split into portions and the portions coupled to respective optic fibers 270. In other embodiments, light source 210 is coupled to a single optic fiber 270, which is subsequently split into multiple optic fibers using an optic fiber splitting/coupling device. The multiple optic fibers then couple to respective optical feeds 240.

In one embodiment, optical feeds 240 each have an endpoint element 250 to independently shape emitted light 260 of each optical feed 240. Additionally and/or alternatively, endpoint elements 250 have different optical filters with respective passbands corresponding to different wavelengths. Thus, emitted light 260 from each optical feed 240, and their respective optical beams 261, have different wavelengths. Such a configuration can be one method of implementing FDM or WDM networking. With this configuration, independent optical feeds 240 can broadcast to the same sector 140 (FIG. 1) to provide communications with multiple CPEs 130 residing within the same sector 140, each operating at different wavelengths.

In one embodiment of FSPMO transceiver 203, mounting elements 220 comprise the fiber positioners used to mount and adjust optical feeds 240 to reflective element 230a. Optic fibers 270 are fed through a backend of their respective fiber positioners and coupled to the optical feeds 240 within the fiber positioners. Alternatively, optical feeds 240 may extend through the fiber positioners and protrude out the backend thereof. In this embodiment, optical feeds 240 are coupled to their respective optic fibers 270 outside a housing of the fiber positioner.

Figure 4B:
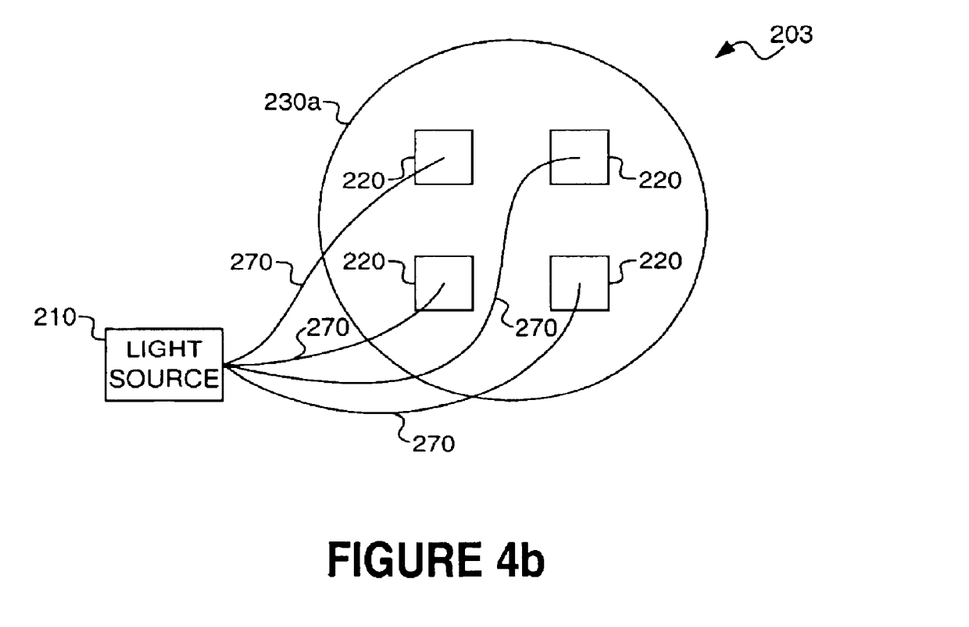
FIG. 4b illustrates an example mounting configuration of optical feeds in accordance with the teachings of the present invention.

FIG. 4b is a rear view of one embodiment of FSPMO transceiver 203. In one embodiment, reflective element 230a is substantially circular. In various other embodiments, reflective element 230a is any other practical shape, including elliptical. The size and/or shape of reflective element 230a may be adjusted to optimize transmit and receive efficiencies of FSPMO transceiver 203.

In one embodiment, mounting elements 220 and their corresponding optical feeds 240 are placed in a uniform pattern to evenly share reflective surface 230b. In various other embodiments, the placement of optical feeds 240 may not be uniform; rather, is adjusted to optimize operation of FSPMO transceiver 203 to a particular environment.

Furthermore, the concave silhouette shape, as depicted in FIG. 4a, need not be a uniform concave shape. Rather, reflective element 230a may deviate from a uniform concave shape such that each optical feed 240 faces a desired direction. This may be accomplished by bending the concave shape in predetermined sections of reflective element 230a, while other sections retain their concave shape, each of the other sections having its own focal plane and corresponding optical feed 240 facing a different remote location.

Figure 5:
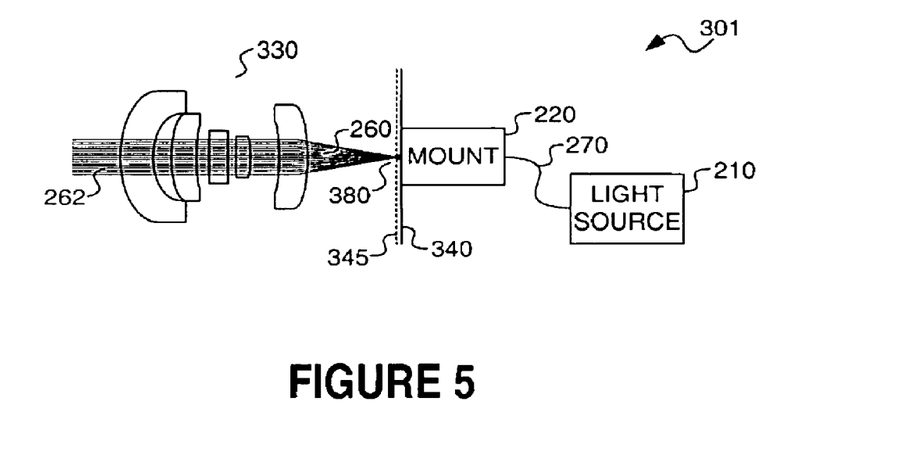
FIG. 5 illustrates a first refractive embodiment of the FSPMO transceiver in accordance with the teachings of the present invention.

In a first example refractive embodiment, as illustrated in FIG. 5, light source 210 for producing light 260 is optically coupled to a light emitter. In the embodiments illustrated in FIGS. 5 through 7, the light emitter comprises an optic fiber tip 380. Additionally, optic fiber tip 380 may include a beam-forming, wavelength filtering and/or focusing optical elements. Optic fiber tip 380 is coupled to light source 210 by any of the methods discussed in conjunction with the various embodiments disclosed above. Other approaches that couple optic fiber tip 380 to light source 210 are within the scope of various embodiments.

In one embodiment, emitted light 260 from optic fiber tip 380 is directed towards a refractive lens assembly 330. Refractive lens assembly 330 receives emitted light 260 and refracts it outwards in the form of a wide field optical beam 262 to be received by one or more CPEs 130. An example refractive lens assembly 330, such as shown in FIG. 5, comprises a fisheye lens assembly; however, it may be any lens assembly providing a wide field of view in other embodiments.

In one embodiment, wide field optical beam 262 comprises a sector optical beam. The angular size of a sector optical beam can range from just large enough to target a single CPE 130 to 180 degrees (e.g., hemisphere) targeting a multitude of CPEs 130. In another embodiment, wide field optical beam 262 is a collimated optical beam. Various embodiments of the collimated optical beam have varying cross-sectional diameters. In one embodiment, the cross-sectional diameter is just large enough to engulf a receiver node of CPE 130. In another embodiment, the cross-sectional diameter is large enough to target a CPE 130 mounted on a building and accommodate for swaying of the building and for fluctuations in the index of refraction of air due to temperature fluctuations. In yet another embodiment, the cross-sectional diameter is larger enough to simplify and even eliminate point and tracking circuitry.

In one embodiment, optic fiber tip 380 is mounted on a support frame 340 using a mounting element 220. The various types of mounting elements discussed above, in conjunction with FSPMO transceiver 201, are within the scope of various embodiments of FSPMO transceiver 301. The size and shape of support frame 340 may be optimized to the particular operating configuration.

In one embodiment, support frame 340 provides support to both mounting element 220 and refractive lens assembly 330. Furthermore, mounting element 220 positions optic fiber tip 380 in or near a focal plane 345 of refractive lens assembly 330.

Figure 6:
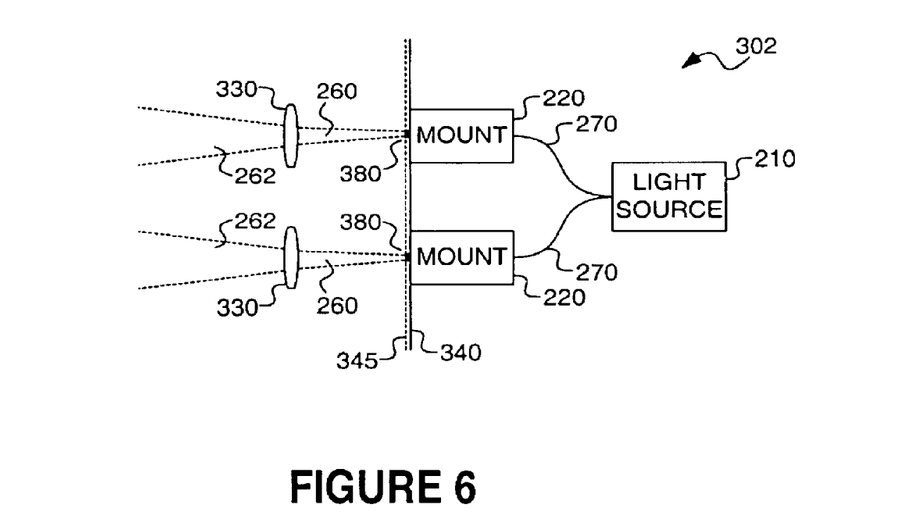
FIG. 6 illustrates a second refractive embodiment of the FSPMO transceiver configured to provide multiple wide field optical beams in accordance with the teachings of the present invention.

FIG. 6 depicts an embodiment of a FSPMO transceiver 302 where the refractive lens assembly 330 is shown as a single element in this and subsequent figures, as compared to FIG. 5, for simplicity of illustration. Embodiments of FSPMO transceiver 302 are similar to embodiments of FSPMO transceiver 301, except that FSPMO transceiver 302 provides multiple wide field optical beams 262. Multiple refractive lens assemblies 330 refract emitted light 260 from corresponding optic fiber tips 380 towards corresponding CPEs 130. Embodiments of FSPMO transceiver 302 have independent light sources 210 corresponding to each optic fiber tip 380, or alternatively, share a single light source 210, as depicted in FIG. 6.

Figure 7:
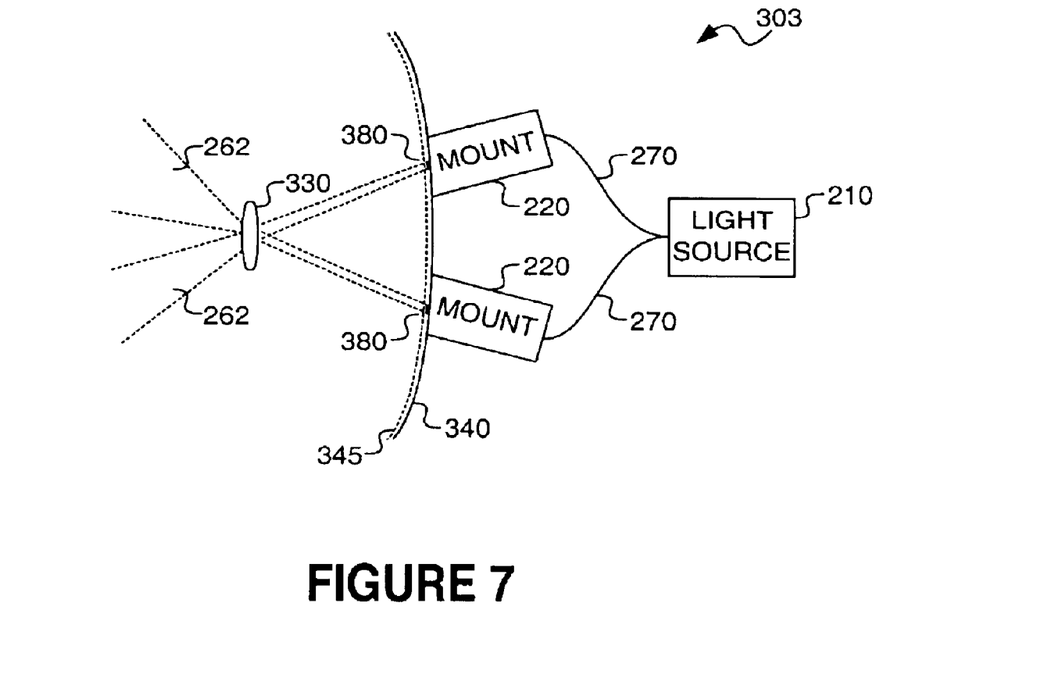
FIG. 7 illustrates a third refractive embodiment of the FSPMO transceiver configured to provide multiple wide field optical beams implemented with a single refractive lens assembly in accordance with the teachings of the present invention.

FIG. 7 illustrates an embodiment of a FSPMO transceiver 303, which provides multiple wide field optical beams 262 using a shared refractive lens assembly 330. Embodiments of FSPMO transceiver 303 are similar to embodiments of FSPMO transceiver 302, except that optic fiber tips 380 are positioned to direct their emitted light 260 through a single refractive lens assembly 330. Optic fiber tips 380 are positioned in or near a focal surface 345 of refractive lens assembly 330. In one embodiment, focal surface 345 of refractive lens assembly 330 is a flat focal plane. In an alternative embodiment, it is a curved focal plane. In either embodiment, support frame 340 is shaped to follow focal surface 345 so that terminal ends of optic fiber tips 380 are in or near focal surface 345.

Figure 8A:
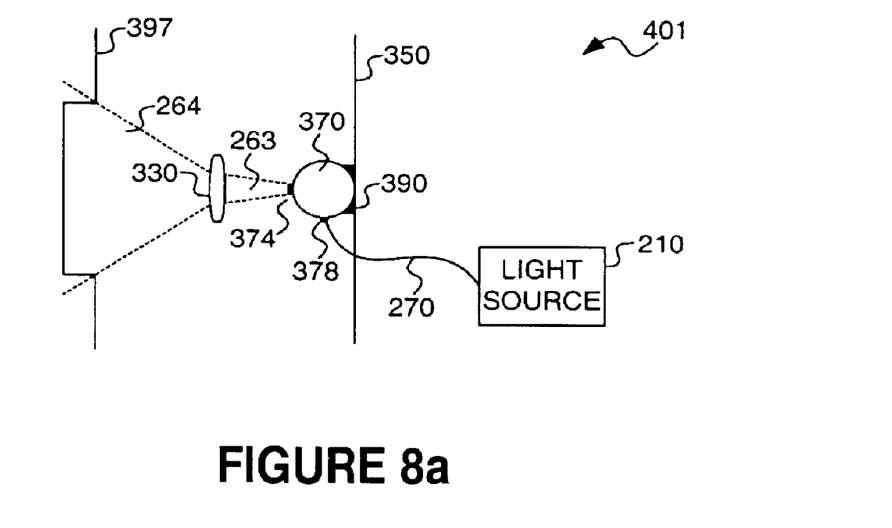
FIG. 8a illustrates a first flat-top transmitter embodiment of a FSPMO transmitter in accordance with the teachings of the present invention.

FIG. 8a illustrates an embodiment of a flat-top FSPMO transmitter 401 implemented with the light emitter comprising a uniform intensity generator 370. Light source 210 is optically coupled via optic fiber 270, or other methods as discussed above, to an input port 378 of uniform intensity generator 370. Light received by input port 378 is reflected off the inside surface of integration sphere 370 multiple times until it reaches an output port 374. Light received by output port 374 is emitted towards refractive lens assembly 330 as emitted light 263. Refracted lens assembly 330 refracts emitted light 263 towards a remote location in the form of a wide field optical beam 264 having a uniform intensity distribution 397. As discussed above, refractive lens assembly 330 may be configured to refract emitted light 263 into a sector optical beam with a predetermined divergence angle or collimate the light into a collimated optical beam with a wide cross-sectional radius. In either embodiment, wide field optical beam 264 has uniform intensity distribution 397.

A feature of flat-top FSPMO transmitter 401 is that it can provide a method of uniformly distributing light to an entire sector with little or no pointing, tracking, or alignment issues. Receivers can be placed anywhere within the covered sector and still capture enough photons to operate. These concepts are illustrated in FIGS. 8b and 8c.

Figure 8B:
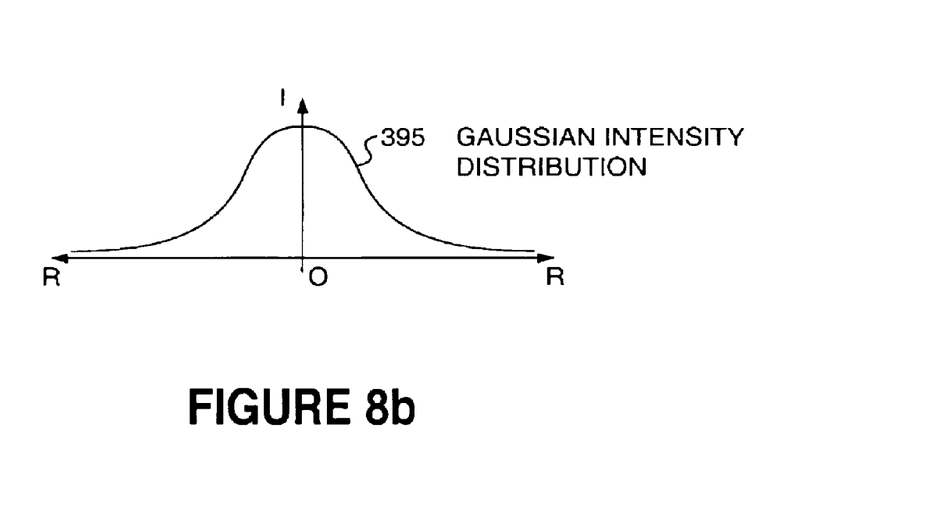
FIG. 8b illustrates a Gaussian output intensity distribution of a typical laser versus radial distance from a center translational axis of an output light beam.
Figure 8C:
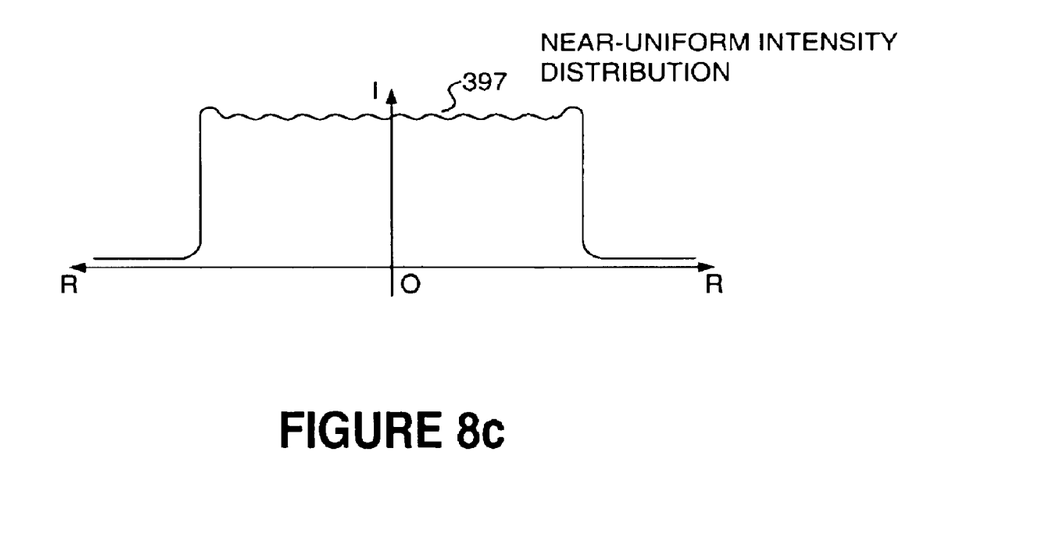
FIG. 8c illustrates a uniform output intensity distribution of a flat-top transmitter versus radial distance from the center translational axis of the output light beam.

A propagating light wave generated by light source 210 and received by input port 378 has a Gaussian cross-sectional intensity distribution 395 as illustrated in FIG. 8b. The intensity of the light is strongest along the center translational axis (R=0) of the propagating light wave and drops off with increasing radial distance from the center translational axis. Emitted light 263 has uniform intensity distribution 397 as illustrated in FIG. 8c. Uniform intensity distribution 397 can be provided via the various component(s) of uniform intensity generator 370.

In one embodiment, uniform intensity generator 370 of flat-top FSPMO transmitter 401 is mounted to a support frame 350 using a mounting element 390. Mounting element 390 can be a bracket providing a mechanism for manually aligning uniform intensity generator 370 and locking it into position. Alternatively, mounting element 390 may simply be a fixed element, such as epoxy or other rigid mount, and the entire support frame 350 may be aimed towards a remote location. In yet another embodiment, the mounting element may be an automated adjustable mount capable of continual adjustment. Other approaches that provide adjustable mounting of integration sphere 370 are within the scope of various embodiments.

Figure 9:
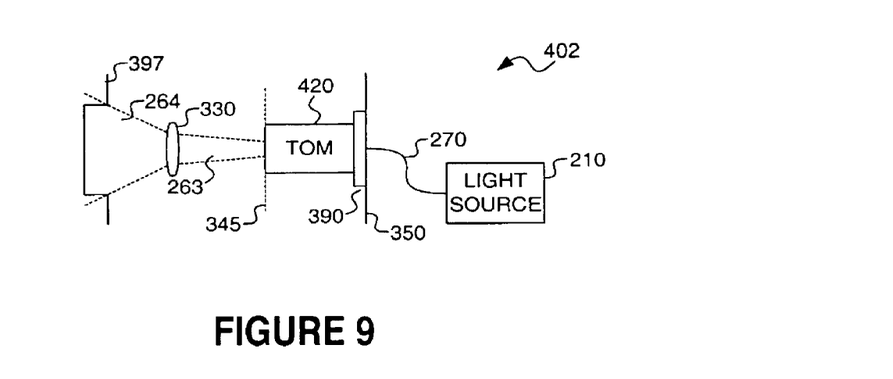
FIG. 9 illustrates a second flat-top transmitter embodiment of the FSPMO transmitter implemented with a Transformer Optical Module ("TOM") in accordance with the teachings of the present invention.
Figure 10:
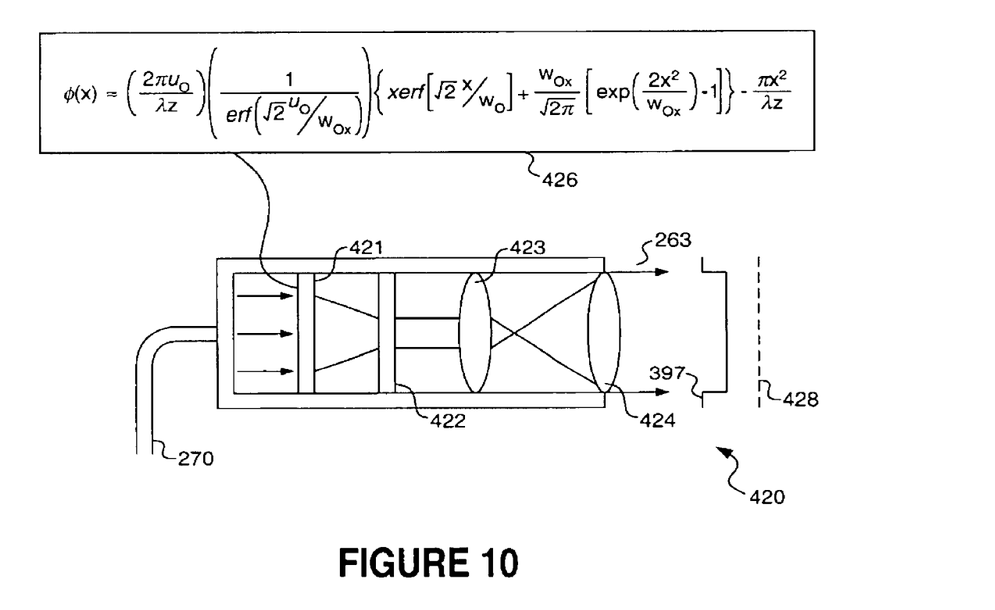
FIG. 10 illustrates an embodiment of the TOM in accordance with the teachings of the present invention.

FIG. 9 illustrates an embodiment of a flat-top FSPMO transmitter 402 implemented with uniform intensity generator 370 comprising a Transfer Optical Module ("TOM") 420. An embodiment of TOM 420 is illustrated in FIG. 10. TOM 420 receives light from optic fiber 270 having Gaussian cross-sectional intensity distribution 395. The received light is directed onto a diffractive optical element ("DOE") 421. DOE 421 manipulates the phase of the received light to convert its cross-sectional intensity distribution to uniform intensity distribution 397. DOE 421 can be formed as an optical element having an etched surface that is based on a phase function equation 426, in one embodiment, where $\phi(x)$ is the phase modulo in one dimension. However, although DOE 421 does flatten the intensity, an ancillary effect of DOE 421 is a distorted phase of the output light. The output light from DOE 421 impinges on a DOE 422, which is an identical, but oriented backwards and upside-down, version of DOE 421, in one embodiment. DOE 422 corrects the phase of the impinging light and collimates it. The phase corrected and collimated light emitted from DOE 422 is received by a diverging lens 423. The light emitted by diverging lens 423 is received by exit lens 424, which controls the exit divergence of TOM 420.

In one embodiment, exit lens 424 collimates and controls the exit lens divergence of emitted light 263. In another embodiment, exit lens 424, diverging lens 423, and DOE 422 are manipulated to diverge emitted light 263.

In one embodiment, TOM 420 may be operated to produce multiple spatially separated optical beams each having uniform intensity distribution 397. Multiple spatially separated optical beams may be used to target multiple spatially separated CPEs 130 without broadcasting light to empty regions between CPEs 130. By not transmitting light to the empty regions, the transmit-receive efficiency between TOM 420 and CPEs 130 is increased by concentrating emitted photons on the intended targets (e.g., CPEs 130).

In one embodiment, the multiple spatially separated optical beams are achieved by inserting a matrix grating 428 in the optical path of optical beam 264, after exit lens 424. In one embodiment, matrix grating 428 is an N×N transmission grating, which produces N×N spatially separate optical beams. Each spatially separate optical beam corresponds to a diffraction order of matrix grating 428. The separation distance between the spatially separate optical beams at CPEs 130 is proportional to a separate distance between grating grooves of matrix grating 428.

An example of a TOM 420 that can be used in an embodiment of the present invention is disclosed in U.S. application Ser. No. 09/938,896, entitled "TRANSMITTER USING UNIFORM INTENSITY TRANSMISSION FOR A WIRELESS OPTICAL COMMUNICATION SYSTEM," filed Aug. 24, 2001, and incorporated herein by reference.

Figure 11:
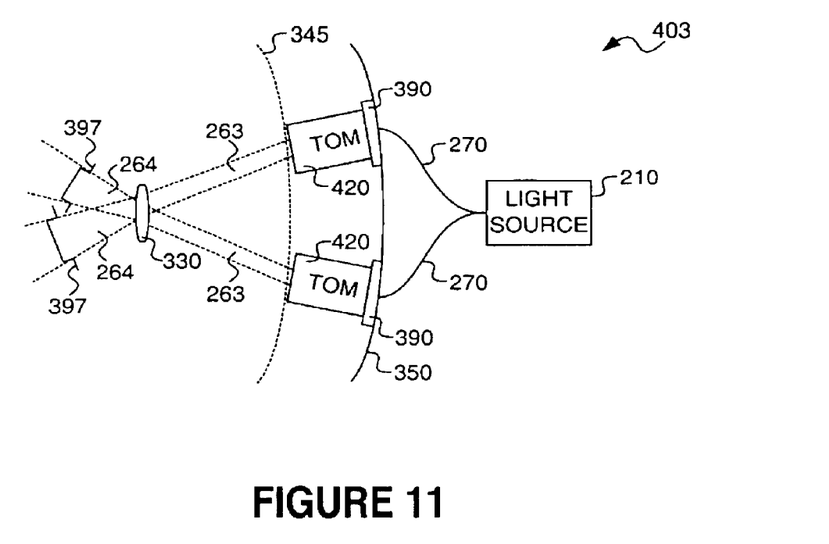
FIG. 11 illustrates a third flat-top transmitter embodiment of the FSPMO transmitter configured to provide multiple wide field optical beams in accordance with the teachings of the present invention.

FIG. 11 depicts an embodiment of a FSPMO transmitter 403, which provides multiple wide field optical beams 264 having uniform intensity distributions 397 using corresponding multiple TOMs 420. FSPMO transmitter 403 is similar to FSPMO transmitter 402, except that refractive lens assembly 330 receives emitted light 263 from multiple TOMs 420.

In one embodiment, TOMs 420 are mounted to support frame 350 using mounting elements 390. TOMs 420 are mounted on support frame 350 such that terminal ends of TOMs 420 reside in or near focal surface 345. Mounting elements 390 consists of any of the above disclosed mounting apparatuses. Each mounting element 390 may be independently adjusted such that its corresponding TOM 420 targets individual CPEs 130 or groups of CPEs 130.

Figure 12:
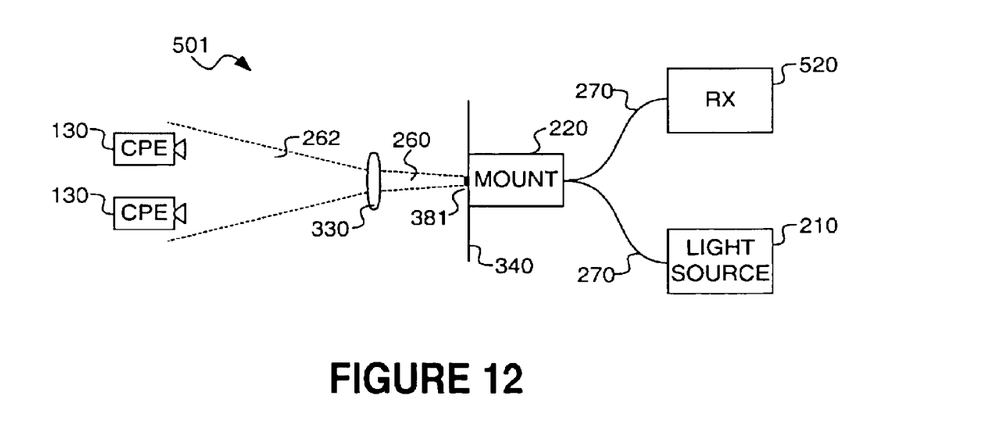
FIG. 12 illustrates a first embodiment of a FSPMO communication system implemented with a refractive lens assembly in accordance with the teachings of the present invention.

An embodiment of a FSPMO communication system 501 implemented with refractive lens assembly 330 is illustrated in FIG. 12. Embodiments of FSPMO communication system 501 may be implemented with similar structures and techniques as disclosed in conjunction with embodiments of FSPMO transceivers 301, 302, and 303.

In one embodiment, light source 210 and an optical receiver 520 are optically coupled to light emitter/receiver 381 via optic fibers 270. Light emitter/receiver 381 directs light received from light source 210 towards refractive lens assembly 330. The light received by refractive lens assembly 330 is refracted towards a remote location to be received by one or more CPEs 130 residing within wide field optical beam 262. Furthermore, CPEs 130 transmit return optical signals back to refractive lens assembly 330. Return optical signals received by refractive lens assembly 330 are mapped onto light emitter/receiver 381 and coupled to optical receiver 520. Optical receiver 520 demodulates and converts the return optical signal into an electrical signal to be used by attached devices.

Figure 13:
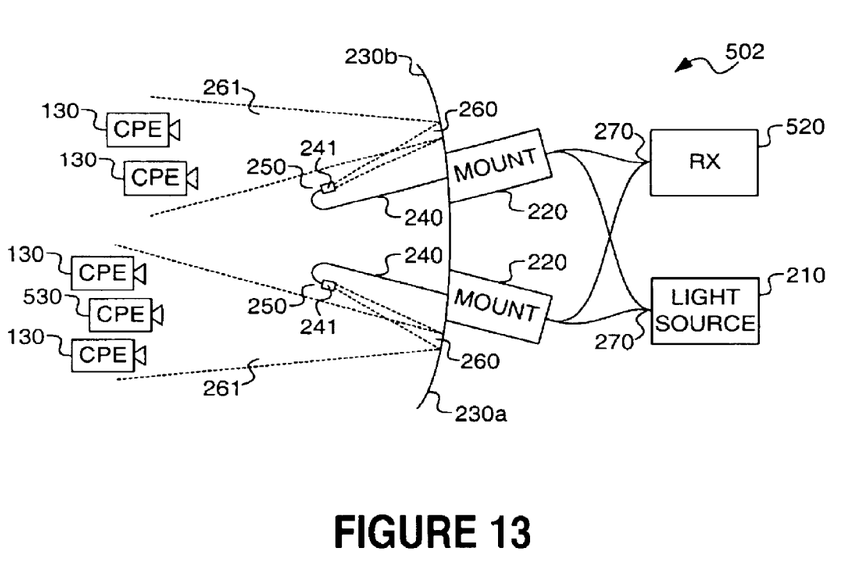
FIG. 13 illustrates a second embodiment of the FSPMO communication system implemented with a reflective element in accordance with the teachings of the present invention.

An embodiment of a FSPMO communication system 502 implemented with reflective element 230a is illustrated in FIG. 13. Embodiments of FSPMO communication system 502 may be implemented with similar structures and techniques as disclosed in conjunction with embodiments of FSPMO transceivers 201, 202, and 203.

In one embodiment, light source 210 and optical receiver 520 are optically coupled to optic feeds 240 via optic fibers 270. Optic feeds 240 are coupled emit light received from light source 210 onto reflective surface 230b, which reflects emitted light 260 in the form of optical beam 261 towards a corresponding remote location. CPEs 130 situated in the remote locations receive optical beam 261. CPEs 130 situated in the remote locations transmit return optical signals back to reflective element 230a, which are reflected onto terminal end 241 of a corresponding optical feed 240. The return optical signals are coupled to an optical receiver 520 via optical feeds 240. Optical receiver 520 demodulates and converts the return optical signal into an electrical signal to be used by attached devices.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
   a light emitter to emit a light signal, the light emitter comprising a uniform intensity generator having an input port optically coupled to receive the light signal and an output port to emit the light signal, wherein the uniform intensity generator is configured to emit the light signal with a uniform intensity distribution and comprises a transmitter having a first diffractive optical element and a second diffractive optical element, the first diffractive optical element to convert an input light signal having a non-uniform intensity distribution to an output light signal having a uniform intensity distribution, the second diffractive optical element to correct a phase distortion in the output light signal output from the first diffractive optical element; and a refractive lens assembly configured to receive the light signal emitted from the light emitter and to refract the light signal to a remote location facing the refractive lens assembly.

2. The apparatus of claim 1, further comprising:

a support frame; and a mounting element to adjustably mount the light emitter to the support frame.

3. The apparatus of claim 2 wherein the light emitter comprises an optic fiber tip.

4. The apparatus of claim 3 wherein the support frame is curved to allow the optic fiber tip to be positioned adjacent to a focal plane of the refractive lens assembly.

5. The apparatus of claim 4 wherein the refractive lens assembly comprises a fisheye lens assembly.

6. The apparatus of claim 2 wherein the mounting element comprises a fiber positioner adjustable about a plurality of axes.

7. The apparatus of claim 6 wherein the fiber positioner is adjustable about five axes.

8. The apparatus of claim 3, further comprising a plurality of optic fiber tips each configured to direct their emitted light signal towards the refractive lens assembly.

9. The apparatus of claim 1 wherein the refractive lens assembly is further capable to receive light sent from a remote location and to direct this received light towards the light emitter, the light emitter further capable to receive this directed light.

10. The apparatus of claim 9 further comprising an optical receiver coupled to the light emitter, the optical receiver capable to receive the light sent from the remote location.

11. An apparatus, comprising:

a light emitter to emit a light signal, the light emitter comprising a uniform intensity generator having an input port optically coupled to receive the light signal and an output port to emit the light signal, wherein the uniform intensity generator is configured to emit the light signal with a uniform intensity distribution and comprises a transmitter having a first diffractive optical element and a second diffractive optical element, the first diffractive optical element to convert an input light signal having a non-uniform intensity distribution to an output light signal having a uniform intensity distribution, the second diffractive optical element to correct a phase distortion in the output light signal output from the first diffractive optical element;

a refractive lens assembly configured to receive the light signal emitted from the light emitter and to refract the light signal to a remote location facing the refractive lens assembly; and a plurality of transmitters to emit a corresponding plurality of light signals to be received by the refractive lens assembly.

12. The apparatus of claim 11, further comprising:

a support frame; and a mounting element to adjustably mount the light emitter to the support frame.

13. The apparatus of claim 12 wherein the light emitter comprises an optic fiber tip.

14. The apparatus of claim 13 wherein the support frame is curved to allow the optic fiber tip to be positioned adjacent to a focal plane of the refractive lens assembly.

15. The apparatus of claim 14 wherein the refractive lens assembly comprises a fisheye lens assembly.

16. The apparatus of claim 12 wherein the mounting element comprises a fiber positioner adjustable about a plurality of axes.

17. The apparatus of claim 16 wherein the fiber positioner is adjustable about five axes.

18. The apparatus of claim 13, further comprising a plurality of optic fiber tips each configured to direct their emitted light signal towards the refractive lens assembly.

19. The apparatus of claim 11 wherein the refractive lens assembly is further capable to receive light sent from a remote location and to direct this received light towards the light emitter, the light emitter further capable to receive this directed light.

20. The apparatus of claim 19 further comprising an optical receiver coupled to the light emitter, the optical receiver capable to receive the light sent from the remote location.

\* \* \* \* \*